L. J. MANOR.
HARROW.
No. 176,975.
2 Sheets—Sheet 2.
Patented May 2, 1876.
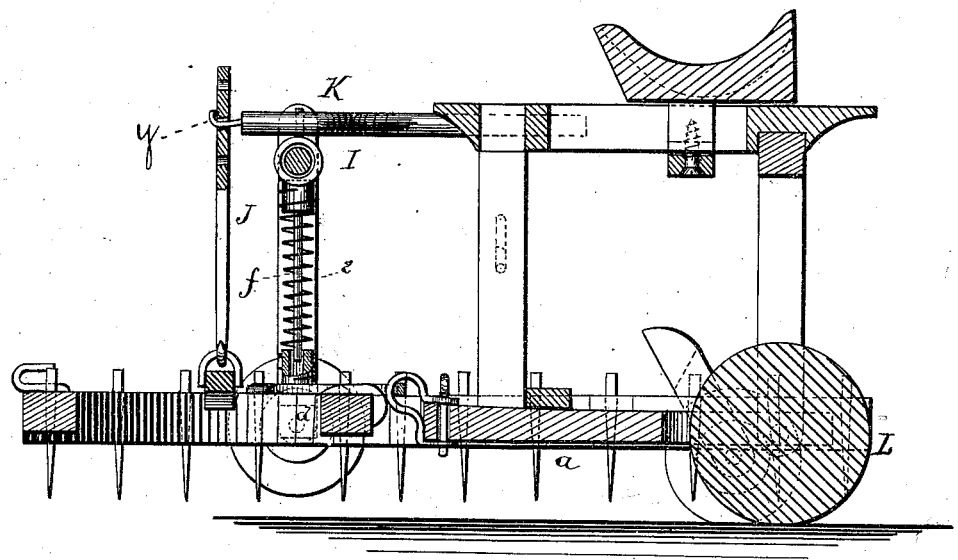
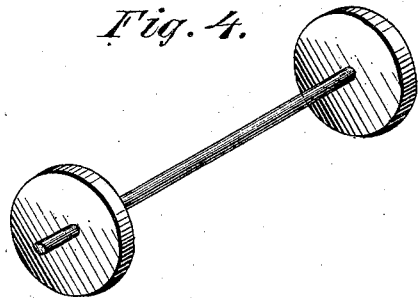
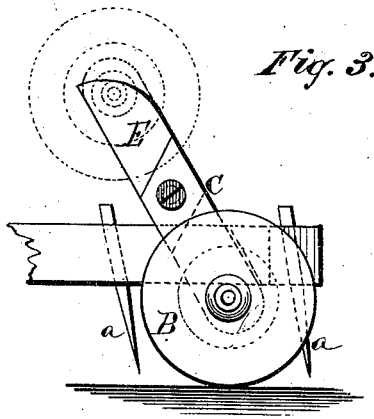
WITNESSES:
P. C. Dieterich
H. C. McArthur
INVENTOR.
Lewis J. Manor.
per J. H. Alexander
ATTORNEY.

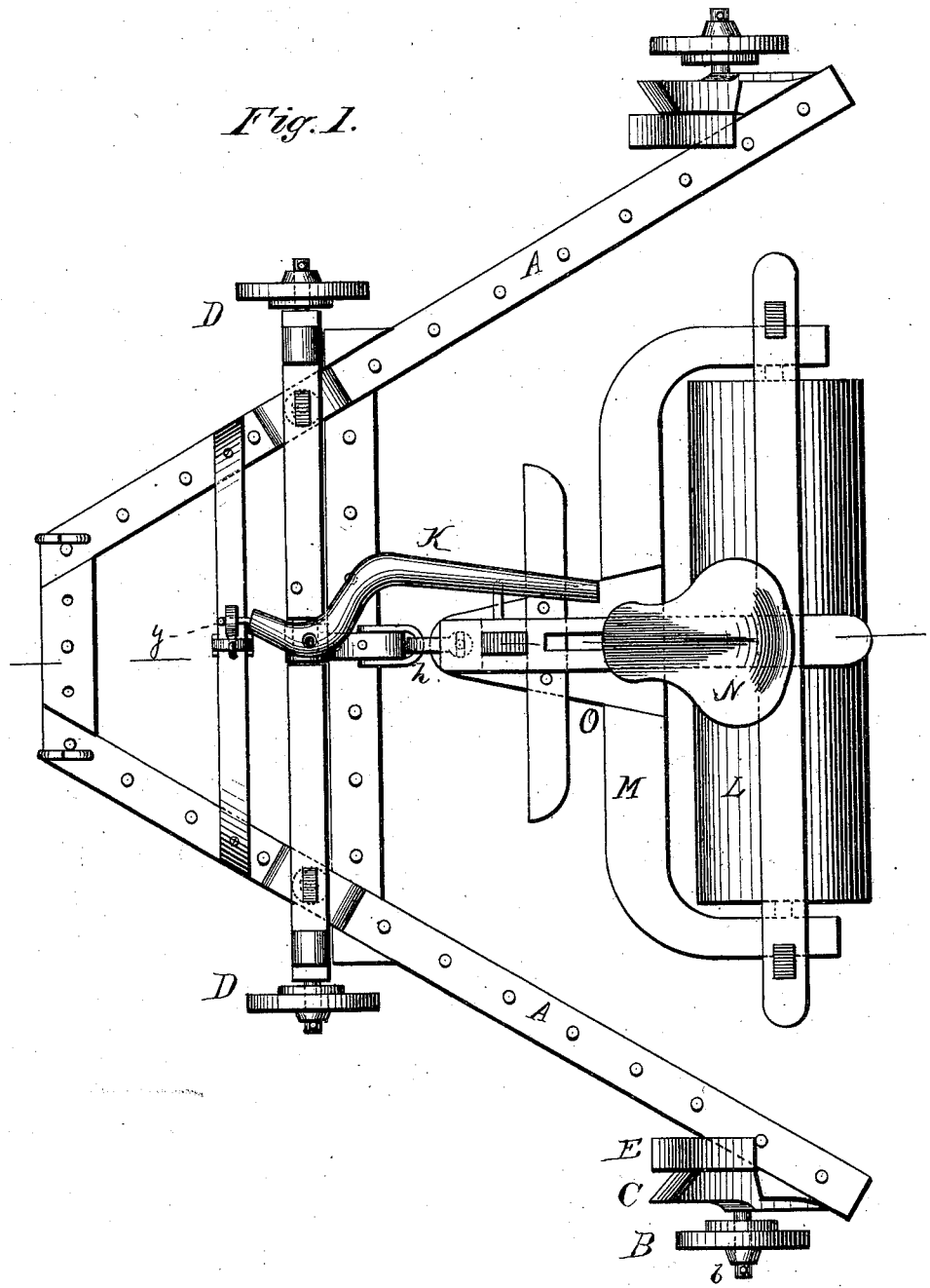

UNITED STATES PATENT OFFICE.

LEWIS J. MANOR, OF DELPHI, ASSIGNOR OF TWO-THIRDS HIS RIGHT TO PATRICK W. CONWAY AND JAMES M. ALLEN, OF CARROLL COUNTY, INDIANA.

IMPROVEMENT IN HARROWS.

Specification forming part of Letters Patent No. 176,975, dated May 2, 1876; application filed December 8, 1875.

*To all whom it may concern:*

Be it known that I, L. J. MANOR, of Delphi, in the county of Carroll and State of Indiana, have invented certain new and useful Improvements in Harrows; and I do hereby declare that the following is a full, clear, and exact description thereof, reference being had to the accompanying drawings, and to the letters of reference marked thereon, which form part of this specification.

The nature of my invention consists in the construction and arrangement of a harrow and pulverizer, as will be hereinafter more fully set forth.

In order to enable others skilled in the art to which my invention appertains to make and use the same, I will now proceed to describe its construction and operation, referring to the annexed drawings, in which—

Figure 1 is a plan view of my invention. Fig. 2 is a longitudinal section of the same. Figs. 3 and 4 are detailed views of parts thereof.

A A represent the side beams of my harrow, being placed closer together at their front than at their rear ends, and the rear end of each beam is supported upon a wheel, B, which is mounted on a spindle, $b$, projecting from an arm, C. This arm is pivoted to a casting, E, in such a manner that it may be turned and throw the wheel either up or down. When thrown down, the harrow-teeth $a$ will be raised from the ground, and the harrow can then be moved about from place to place. When the wheel is thrown up, as represented by dotted lines in Fig. 3, the teeth $a$ will take into the ground. D D are the front wheels for supporting the harrow when going to and from the field. The spindles for these wheels project from boxes $d$, which slide in vertical standards H, and are pressed downward by means of springs $e$, said springs encircling rods $f$, which extend from a cross-bar, I, downward into the hollow upper portions of the sliding boxes. From a cross-bar at or near the front end of the harrow extends a perforated link or bar, J, for the insertion of the pointed end or hook $y$ of a lever, K, which is pivoted on the center of the cross-bar I.

By means of this lever and perforated bar, the front end of the harrow can be easily thrown on and off the wheels D, as required.

L represents the roller, mounted in a frame, M, on top of which is the driver's seat N. The frame M is connected to a tongue, O, which is coupled to a cross-bar of the harrow by a suitable coupling, $h$, which will allow of the roller adjusting or accommodating itself to the unevenness of the ground.

Having thus fully described my invention, what I claim as new, and desire to secure by Letters Patent, is—

1. In a harrow, the combination of the wheels D, sliding boxes $d$, springs $e$, rods $f$, cross-bar I, perforated link J, and lever K, having hook $y$, for engaging in the perforations of the link J, as and for the purposes herein set forth.

2. A single roller, L, connected to the frame M, and coupled to the center of the cross-bar of a harrow, and between the inclined bars A A, as and for the purposes herein set forth.

In testimony that I claim the foregoing as my own I affix my signature in presence of two witnesses.

LEWIS J. MANOR.

Witnesses:
 HENRY GILLAM,
 HOWARD CAMPBELL.